United States Patent [19]

Yip

[11] Patent Number: 4,559,546

[45] Date of Patent: Dec. 17, 1985

[54] INTENSITY CONTROL FOR THE IMAGING BEAM OF A RASTER SCANNER

[75] Inventor: Kwok-leung Yip, Webster, N.Y.

[73] Assignee: Xerox Corporation, Stamford, Conn.

[21] Appl. No.: 647,284

[22] Filed: Sep. 4, 1984

[51] Int. Cl.[4] .............................................. G01D 15/14
[52] U.S. Cl. .................................... 346/160; 346/108; 350/371
[58] Field of Search ...................... 346/188, 160, 76 C; 350/371; 358/300, 302, 296

[56] References Cited

U.S. PATENT DOCUMENTS

| | | | |
|---|---|---|---|
| 3,943,369 | 3/1976 | Saeva | 250/568 |
| 4,246,549 | 1/1981 | Carter et al. | 331/94.5 M |
| 4,367,925 | 1/1983 | Sprague et al. | 350/355 |
| 4,423,927 | 1/1984 | Bly | 350/331 R |
| 4,449,153 | 5/1984 | Tschang | 358/296 |

OTHER PUBLICATIONS

Zilberstein, A Proposal for a Magnetically Controlled Light-Beam Modulator and Shutter, IEEE Proc., vol. 52, No. 12, Dec. 1964, pp. 1751-1752.
De Benedictis et al., Optical Polarization Sensitivity of Lead Molybate, American Physics Letters, vol. 25, No. 1, Jul. 1, 1974, pp. 62-64.
"The Physics and Display Applications of Liquid Crystals", I. A. Shanks, Contemp. Phys. 1982, vol. 23, No. 1, 65-91.
"Voltage Dependent Optical Activity of a Twisted Nematic Liquid Crystal", M. Schadt & W. Helfrich, Applied Physics Letters, vol. 18, No. 4, 2/15/71, pp. 127-128.
"Faraday Rotation in Praseodymium, Terbium, and Dysprosium Alumina Silicate Glasses", C. G. Robinson & R. E. Graf, Applied Optics, vol. 3, No. 10, Oct. 1964, pp. 1190-1191.

Primary Examiner—Thomas H. Tarcza
Attorney, Agent, or Firm—Frederick E. McMullen

[57] ABSTRACT

A raster output scanner in which a twisted nematic liquid crystal is disposed in the path of the linearly polarized scanning beam incident on the scanner modulator to provide controlled rotation of the plane of polarization of the beam to maximize modulator diffraction efficiency and beam intensity, control over the crystal external electric field being either exercised manually or automatically, the latter through a feedback loop using a photodetector to monitor changes in beam intensity at the scanner photoreceptor. In an alternate embodiment, the liquid crystal is replaced by a magneto-optic cell.

10 Claims, 8 Drawing Figures

INTENSITY CONTROL FOR THE IMAGING BEAM OF A RASTER SCANNER

The invention relates to raster output scanners, and more particularly, to apparatus and method for controlling the intensity of the scanner imaging beam.

In raster output scanners, it is essential that the intensity of the scanner imaging beam, which is normally derived from a laser, be accurately controlled at the recording member which typically comprises the photoreceptor in a xerographic system. Control over the imaging beam intensity is critical if the proper exposure level for the particular recording member used is to be assured, and if variations in intensity across the scan line and from scan line to scan line, in the laser output power, and in transmittance, reflectance, and throughput efficiency of the various optical components are to be compensated for. Some control techniques commonly used for this purpose are the addition of neutral density filters to the scanner optical system, making the entire laser tube assembly rotatable to permit the laser to be adjusted for polarization sensitive modulators, adjusting the rf drive power to the modulator by either varying the supply voltage or the amplitude of the image signals being input to the modulator, and adjusting the laser power supply.

However, the addition of neutral density filters and adjustment of the laser tube assembly are only capable of being implemented manually which limits their desirability. On the other hand, adjustments to the modulator drive power and to the laser power supply can be implemented in either manual or automatic fashion, the latter typically being in response to laser beam intensity, which renders these control techniques somewhat more desirable. Notwithstanding, there are certain disadvantages associated with each. In particular, the addition of neutral density filters may induce flare light and beam aberrations. Permitting adjustment of the laser tube assembly can result in pointing errors in the laser beam and require subsequent realignment of the optical components following each adjustment. And although adjustment of either modulator or laser power may be carried out automatically, adjusting the laser power supply is known to be impractical for gas type lasers, which comprise the bulk of present day scanners, while adjusting the modulator drive power requires complex and expensive electronic circuits.

The invention seeks to correct the foregoing problems by providing, in a raster output scanner, the combination of: a polarized beam for imaging a recording member, modulator means for modulating the beam in response to an image signal input, scanning means for scanning the beam across the recording member, and means for rotating the polarization of the beam astride the path of the beam to control the diffraction efficiency of the modulator means and control beam intensity at the recording member.

The invention further provides a method of controlling the intensity of the imaging beam for writing images on the photoreceptor of a raster output scanner, the steps of which comprise: providing a linearly polarized source beam of high intensity radiation for use as the imaging beam; modulating the source beam in accordance with an image signal input to produce the imaging beam for writing images on the photoreceptor in accordance with the content of the image signals; repeatedly scanning the imaging beam across the photoreceptor while advancing the photoreceptor in a direction substantially perpendicular to the direction in which the imaging beam is being scanned to write the images on the photoreceptor; monitoring the intensity of the imaging beam as the imaging beam is scanned across the photoreceptor; and rotating the plane of polarization of the source beam in response to changes detected in the intensity of the imaging beam to thereby change the diffraction efficiency at which the source beam is modulated to assure an imaging beam of substantially constant intensity.

IN THE DRAWINGS

Figure 1:
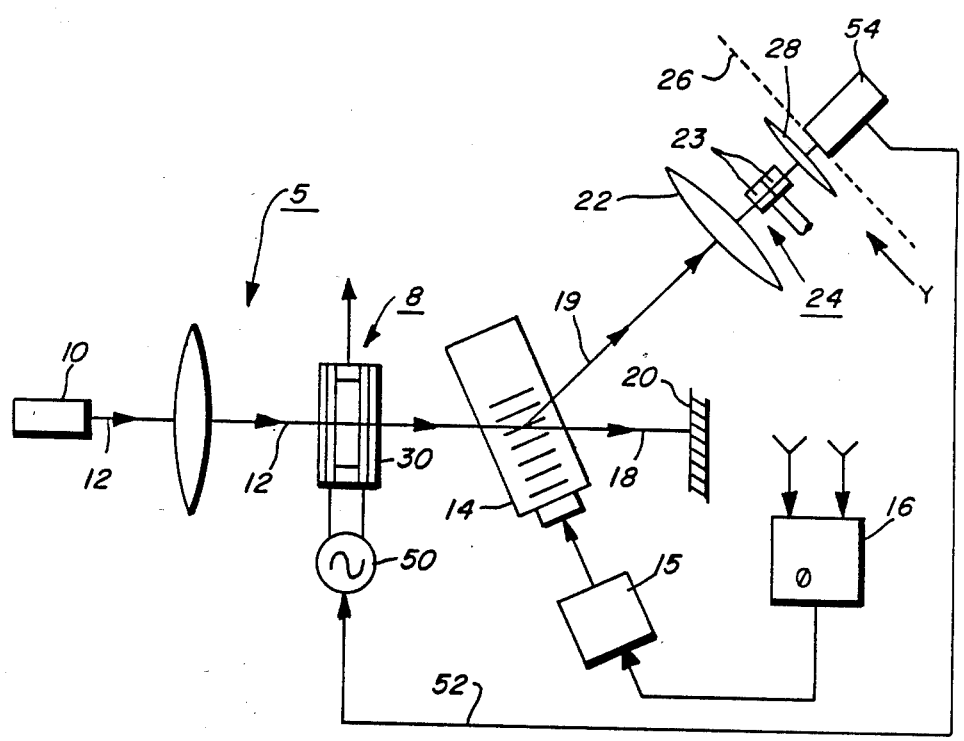
FIG. 1 is a schematic view of a raster output scanner incorporating the intensity control of the present invention.

Referring to FIG. 1 of the drawings, there is shown an exemplary raster output scanner or ROS, designated generally by the numeral 5, incorporating the intensity control 8 of the present invention. ROS 5 includes a suitable source of high intensity radiation such as laser 10, the output beam 12 of which is modulated by a suitable modulating device such as acousto-optic modulator 14 in accordance with an image signal input from image signal source 15 to provide zero and first order beams 18, 19. Zero order beam 18 is impinged against a suitable stop 20 while beam 19, which comprises the imaging beam, is focused by suitable lens means 22 onto the mirrored surfaces or facets 23 of a scanning element shown here in the form of a rotating polygon 24. Polygon 24 scans the imaging beam 19 across a recording member such as the previously charged photoreceptor 26 of a xerographic reproduction system to expose the charged photoreceptor line by line and create a latent electrostatic image representative of the image signal input from image signal source 15. Polygon 24 scans beam 19 in the fast scan or X direction across photoreceptor 26 while the photoreceptor is moved concurrently in the slow scan or Y direction at a suitable rate. An imaging lens 28 focuses the imaging beam 19 onto photoreceptor 26.

Image signal source 15 may comprise any suitable source of image signals, such as a communication channel, memory, raster input scanner, etc. The image signals are clocked out from image signal source 15 a line at a time by the clock signal output $\phi$ of a pixel clock 16, clock 16 being triggered on and off in response to the start and end of each scan line as by suitable Start-Of- Scan (SOS) and End-Of-Scan (EOS) sensor means (not shown).

The latent electrostatic image created on photoreceptor 26 by the imaging beam 19 is developed by a suitable toner at a developing station (not shown), the developed image being transferred to a suitable copy substrate such as a copy sheet at a transfer station (not shown). The copy sheet is thereafter fused or fixed at a fusing station (not shown) and the finished copy discharged into an output device such as a sorter (not shown). Following transfer of the developed image, photoreceptor 26 is cleaned at a cleaning station (not shown) and uniformly charged at a charging station (not shown) in preparation for imaging.

Figure 2:
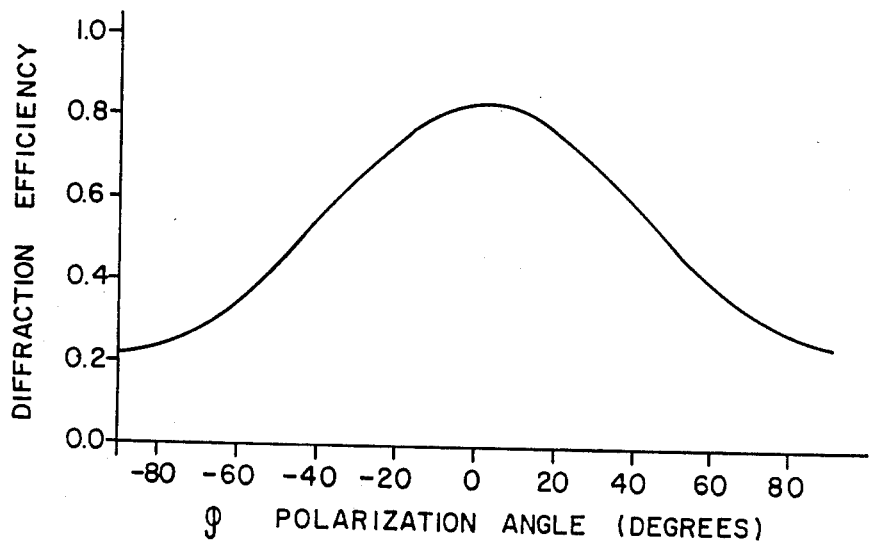
FIG. 2 is a graph plotting the diffraction efficiency of a typical modulator versus the polarization angle of the beam incident thereon.

In the design of high speed and/or high resolution scanners, it may be desirable to use a polarized laser with a highly polarization sensitive, broadband modulator. As shown in FIG. 2, the diffraction efficiency of a modulator such as modulator 14 is a function of the orientation ($\phi$) of the optical polarization angle with respect to the Bragg plane, with the maximum diffraction efficiency occurring at $\phi=0°$ and the minimum diffraction efficiency occurring at $\phi=90°$. The ratio of maximum diffraction efficiency to minimum diffraction efficiency is approximately 3.7:1. As will appear, intensity control 8 enables the optical polarization angle to be rotated to control the diffraction efficiency.

Figure 3:
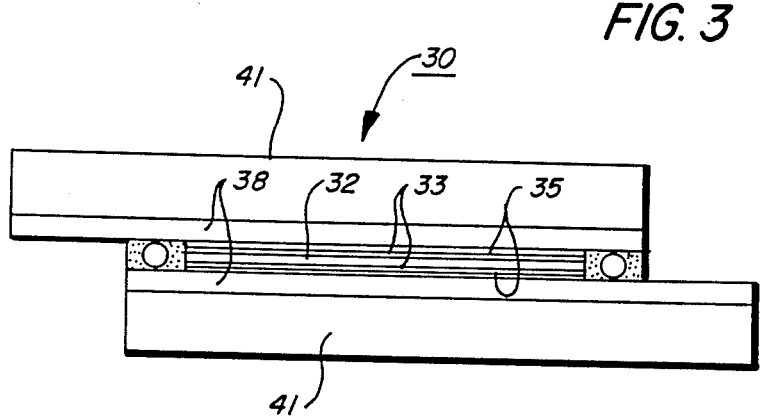
FIG. 3 is a sectional view of a twisted nematic liquid crystal illustrating the internal construction thereof.

In a preferred embodiment, intensity control 8 comprises a twisted nematic liquid crystal 30 of the type shown in FIG. 3. Crystal 30 has a relatively thin nematic liquid crystal layer 32 sandwiched between alignment layers 33. Dielectric barrier layers 35 are disposed between alignment layers 33 and transparent electrode layers 38 with outer glass substrates 41 covering electrode layers 38.

Figure 4A:
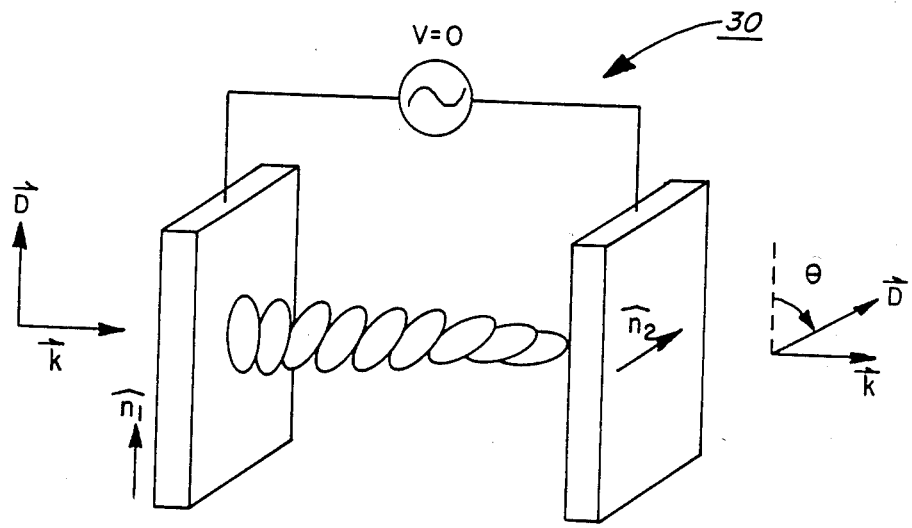
FIGS. 4a and 4b are isometric views of the twisted nematic liquid crystal shown in FIG. 3 when placed in twisted and untwisted molecular alignment conditions.
Figure 4B:
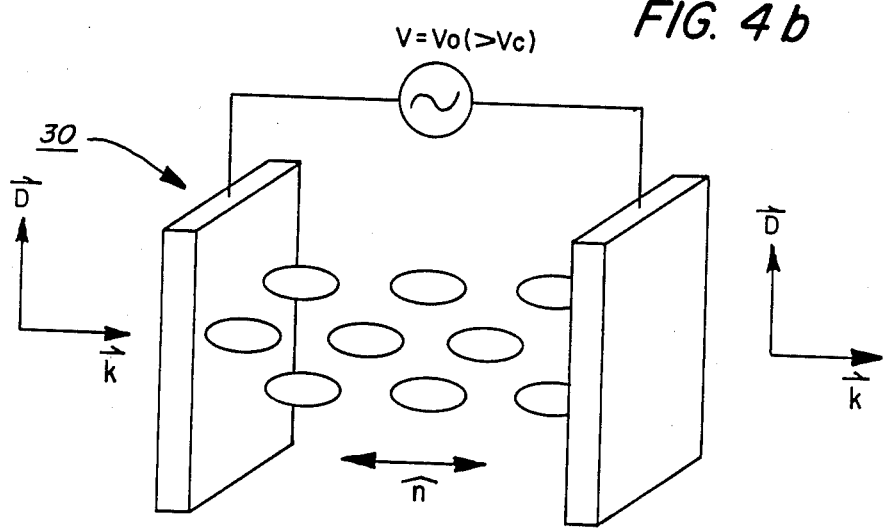

The operation of crystal 30 is shown in FIGS. 4a and 4b. In the absence of an external electric field (V=0), a nematic liquid crystal having a twist angle (the angle between the two director alignments $\hat{n}_1$ and $\hat{n}_2$) and a positive dielectric anisotropy ($E_{81}<E_\perp$) rotates the plane ofpolarization ($\vec{D}$) of a linearly-polarized beam of light incident thereon through the twist angle of the liquid crystal cell 30, provided that the plane of polarization is parallel or orthogonal to the director alignment ($\hat{n}_1$) at the surface of the liquid crystal layer and that $(n_e-n_o)p<<\lambda$, where $(n_e-n_o)$ is the anisotropy in the refractive index, p is the pitch associated with the cell twist, and $\lambda$ is the wavelength of light. Thus, a 90° twist will lead to the 90° rotation shown in FIG. 4a.

If an alternating voltage $V_o$, which is higher than the crystal threshold value ($V_c$) by a few volts, is applied to the cell (FIG. 4b), the direction of the molecular orientation pattern ($\hat{n}$) will be realigned and become parallel to the applied field, that is, normal to the cell walls. This destroys the rotatory power of the cell and accordingly there will be no rotation of the plane of polarization of the incident light.

Figure 5:
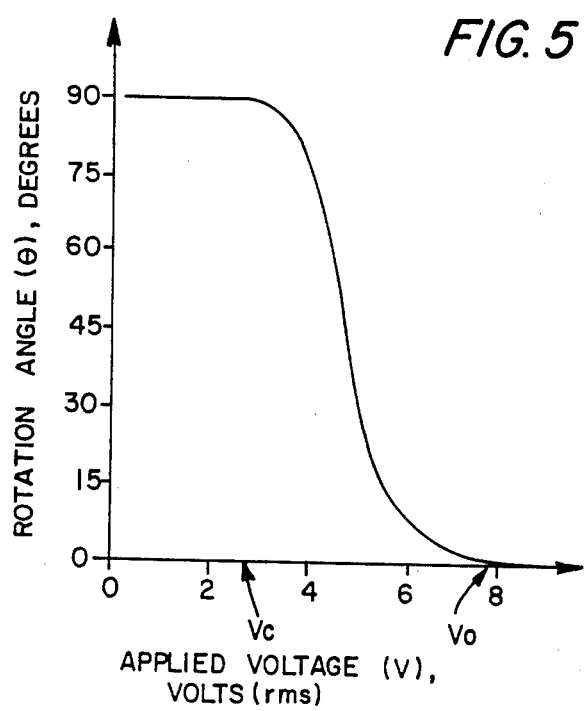
FIG. 5 is a graph plotting the degree of rotation imposed by a twisted nematic liquid crystal on the plane of polarization of an incident beam versus applied voltage.

FIG. 5 shows the dependence of the rotation angle of an incident linearly polarized light on the applied voltage for a typical twisted nematic liquid crystal. It can be seen that by applying an intermediate voltage V ($V_c \leq V \leq V_o$) to the crystal, the polarization of the light can be rotated continuously from 0° to 90°.

The threshold voltage of a twisted nematic liquid crystal is given by the following equation:

$$V_c = \left\{ \frac{4\pi}{E_\| - E_\perp} \left[ k_{11}\left(\frac{\pi}{2}\right)^2 + (k_{33} - 2k_{22})\phi_o^2 \right] \right\}^{\frac{1}{2}}$$

where $E_\|$ and $E_{TM}$ are the parallel and perpendicular permittivity components; $k_{11}$, $k_{22}$, and $k_{33}$ are the elastic moduli for splay, twist, and bend respectively; and $\phi_o$ is the twist angle. Accordingly, it can be seen that the threshold voltage can be made very small (i.e. 1-2 v) if $(k_{33}-2k_{22})<0$, and that the required operating voltage for crystals of this type is very low ie, 3-10V.

Figure 6:
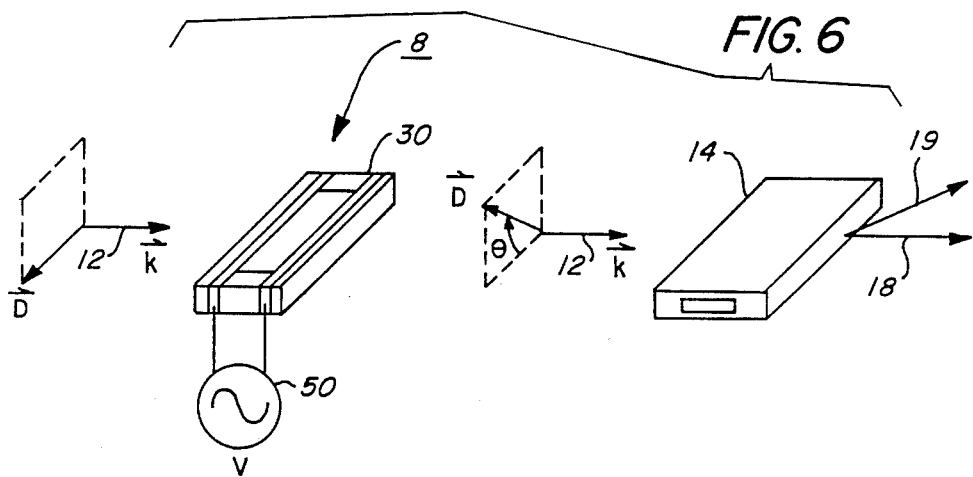
FIG. 6 is a schematic representation depicting the operational relation between a twisted nematic liquid crystal, the incident beam, and the beam modulator in a scanner.

Referring to FIG. 6, there is depicted an example of an adjustment to the plane of polarization of beam 12 by crystal 30 of intensity control 8 prior to the beam reaching modulator 14. There, the plane of polarization ($\vec{D}$) of the incident beam is presumed to be at an angle of 0°. The application of a predetermined external electric field (V) to crystal 30 rotates the polarization of beam 12 by an angle $\theta$ with resultant change in diffraction efficiency of modulator 14.

Referring now to FIG. 1, crystal 30 of intensity control 8 is disposed athwart the path of beam 12 at a point upstream of modulator 14. A variable a.c. voltage source 50 provides the external electrical field (V) for controlling the twist angle of crystal 30, voltage source 50 being controlled through a feed back loop 52 in response to the intensity of imaging beam 19 as the beam is scanned across photoreceptor 26 by polygon 24. To measure beam intensity, a suitable detector such as photocell 54 is placed in the scanning path of beam 19 as the beam scans in the fast scan or X direction. The signal output of photocell 54 is fed via loop 52 to the control input of voltage source 50 to control the external electrical field (V) across crystal 30 and accordingly the rotation of polarization impressed on beam 12 by the crystal 30.

Figure 7:
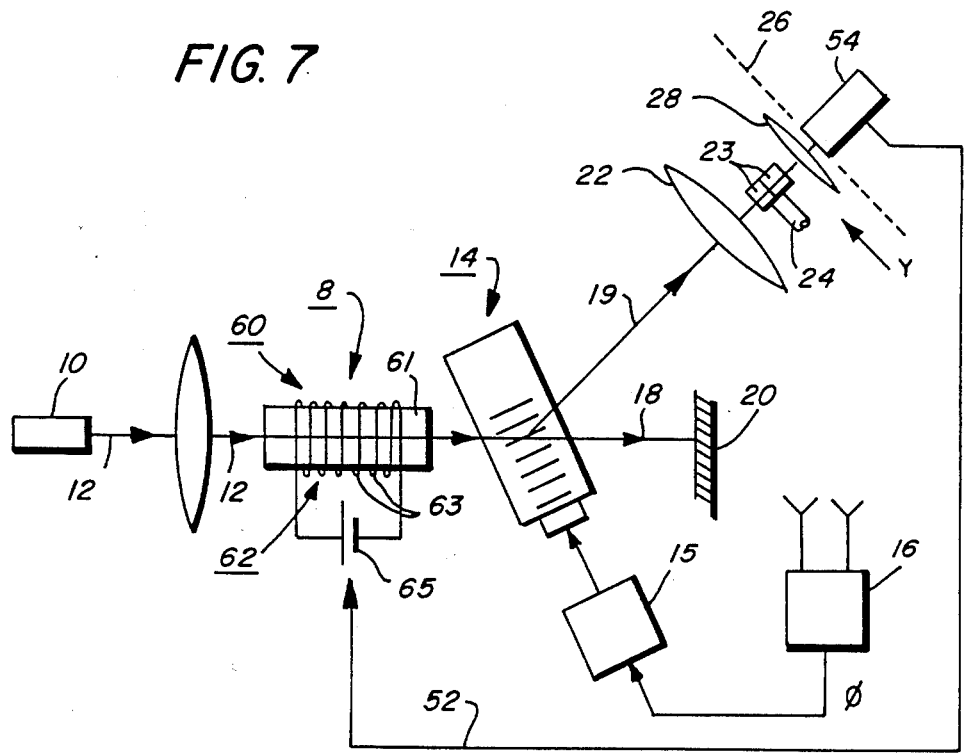
FIG. 7 is a schematic view of an alternate embodiment wherein a magneto-optic cell is instead used to control the degree of rotation of the plane of polarization of the incident beam in response to beam intensity in a scanner.

In the embodiment shown in FIG. 7, where like numbers refer to like parts, intensity control 8 relies on the magnetic (i.e. Faraday) effect of a magneto-optic material to rotate the plane of polarization of beam 12 and control the diffraction efficiency of modulator 14. For that purpose, a magnetic cell 60 is substituted in place of the twisted nematic liquid crystal 30. Magnetic cell 60 has a core 61 of suitable magneto-optic material such as paramagnetic glass ($Dy^3+$—Al—Si) with an electromagnetic coil 62 having a predetermined number of turns of wire 63 therearound. A d.c. voltage source 65 coupled to coil 62 provides the external magnetic field (H) for controlling the rotation of twist angle of cell 60, the control input of voltage source 65 being coupled to beam intensity detecting photocell 54 through feedback loop 52.

When the polarized beam 12 is sent through the magneto-optic material 61 of cell 60 in a direction parallel to the magnetic field (H) established by coil 62 in the material 61, the plane of polarization of beam 12 is rotated. Where coil 62 is inactivated, the plane of polarization of beam 12 remains unchanged.

As will be understood, the amount of rotation ($\theta$) for any magneto-optic material is proportional to the field strength (H) and to the distance (L) the light travels through the material in accordance with the following equation:

$$\theta = (Ve)(H)(L),$$

where: Ve is the Verdet constant of the material. (The Verdet constant is defined as the rotation per unit path per unit field strength).

Generally, the sign of the Verdet constant (Ve) is positive for diamagnetic materials and negative for paramagnetic and ferromagnetic materials. Where magneto-optic material 61 has a positive Verdet constant, rotation of the plane of polarization of the beam will be in the same direction as the current flow in coil 62 while magneto-optic materials having a negative Verdet constant rotate the plane of polarization of the beam in the opposite direction as the current flow in coil 62. The magnetic field generated by coil 62 is proportional to the current and the number of turns of wire 63 per unit length of coil 62.

Magneto-optic materials with a high Verdet constant and low absorption coefficient at the wavelength of interest are preferred. For example, the aforementioned paramagnetic glass, which may be produced by dissolving a high concentration of dysprosium ion in an alumina silicate glass, has a Verdet constant of $-0.272$ $min/O_{e\text{-}cm}$ and an absorption coefficient of $0.008_{cm}-1$ at a wavelength of 0.6328 μm at room temperature. To achieve a rotation of 90°, two centimeters of $Dy^{3+}$—Al—Si glass in field of $10^4$ $O_e$ are required. Other magneto-optic materials such as diamagnetic lead silicate optical glass, bismuth iron garnet film, etc. may be envisioned.

While the invention has been described with reference to the structure disclosed, it is not confined to the details set forth, but is intended to cover such modifications or changes as may come within the scope of the following claims.

I claim:

1. In a raster output scanner employing a polarized beam for scanning a recording member, modulator means for modulating the beam in response to an image signal input, and scanning means for scanning the beam across the recording member, the improvement comprising:

beam polarization rotating means astride the path of said beam for rotating the plane in which said scanning beam is polarized to control the diffraction efficiency of said modulator means and control beam intensity at said recording member.

2. The scanner according to claim 1 in which said beam polarization rotating means comprises a twisted nematic liquid crystal in the path of said beam upstream of said modulator means.

3. The scanner according to claim 1 in which said beam polarization rotating means comprises a magneto-optic cell in the path of said beam upstream of said modulator means.

4. The scanner according to claim 1 including control means for controlling the rotation of polarization imparted to said beam by said beam polarization rotating means in response to the intensity of said beam whereby to maintain predetermined intensity at said recording member.

5. The scanner according to claim 4 in which said beam polarization rotating means comprises a twisted nematic liquid crystal in the path of said beam upstream of said modulator means.

6. The scanner according to claim 5 in which said control means includes:

(a) a source of electrical potential for generating an external electric field across said crystal to vary the rotation of polarization imparted to said beam by said crystal;

(b) beam intensity detector means in the path of said beam for producing a signal responsive to the intensity of said beam; and (c) means for varying said electrical potential to vary the external electric field across said crystal in response to the signal output of said detector means whereby to vary the rotation of polarization imparted to said beam by said crystal to maintain predetermined beam intensity.

7. The scanner according to claim 4 in which said beam polarization rotating means comprises a magneto-optic cell in the path of said beam upstream of said modulator means.

8. The scanner according to claim 7 in which said control means includes:

(a) a source of electrical potential for generating an external magnetic field across said magneto-optic cell to vary the rotation of polarization imparted to said beam by said magneto-optic cell;

(b) beam intensity detector means in the path of said beam for producing a signal responsive to the intensity of said beam; and (c) means for varying said electrical potential to vary the external magnetic field across said magneto-optic cell in response to the signal output of said detector means whereby to vary the rotation of polarization imparted to said beam by said magneto-optic cell to maintain predetermined beam intensity.

9. Means for controlling the diffraction efficiency of a polarization sensitive modulator in a raster output scanner to control the intensity of a scanning beam for producing images on the scanner recording member, said modulator modulating a linearly polarized beam in response to an image signal input to produce said scanning beam, comprising in combination:

(a) a twisted nematic liquid crystal interposed in the path of said linearly polarized beam, said crystal being upstream of said modulator;

(b) generating means for producing an external electrical field across said crystal, said crystal being adapted to rotate said beam polarization through an angle proportional to the strength of the electric field produced by said generating means as said beam passes through said crystal;

(c) intensity detecting means for monitoring the intensity of said scanning beam; and (d) control means for controlling the strength of said electrical field produced by said generating means in response to the output of said intensity detecting means whereby to control the rotation of polarization of said beam by said crystal to control modulator diffraction efficiency and scanning beam intensity.

10. The method of controlling the intensity of the imaging beam for writing images on the photoreceptor of a raster output scanner, comprising the steps of:

(a) providing a linearly polarized source beam of high intensity radiation for use as said imaging beam;

(b) modulating said source beam in accordance with an image signal input to produce said imaging beam for writing images on said photoreceptor in accordance with the content of said image signals;

(c) repeatedly scanning said imaging beam across said photoreceptor while advancing said photoreceptor in a direction substantially perpendicular to the direction in which said imaging beam is being scanned to write said images on said photoreceptor;
(d) monitoring the intensity of said imaging beam as said imaging beam is scanned across said photoreceptor; and
(e) rotating the plane of polarization of said source beam in response to changes detected in the intensity of said imaging beam to thereby change the diffraction efficiency at which said source beam is modulated to assure an imaging beam of substantially constant intensity.

* * * * *